United States Patent Office 3,414,615
Patented Dec. 3, 1968

3,414,615
4-TRIFLUOROMETHYLBICYCLO[2.2.2]-OCTANE-
1-AMINES AND OCT-2-ENE-1-AMINES
Walter A. Gregory, Wilmington, and Joel G. Whitney,
Claymont, Del., assignors to E. I. du Pont de Nemours
and Company, Wilmington, Del., a corporation of
Delaware
No Drawing. Filed Feb. 3, 1966, Ser. No. 524,858
5 Claims. (Cl. 260—563)

This invention relates to substituted bicyclo[2.2.2]octanes and oct-2-enes. More particularly this invention refers to novel 4-trifluoromethylbicyclo[2.2.2]octane-1-amines and oct-2-ene-1-amines and their use as antidepressants.

According to this invention we have discovered a novel class of compounds which are useful in pharmaceutical applications. Particularly, they are antidepressant agents as shown by their ability to antagonize tetrabenazine-induced sedation in mice, to potentiate the norepinephrine pressor effect in ganglion-blocked anesthetized dogs, and to antagonize the phenethylamine pressor effect in ganglion-blocked, anesthetized dogs.

The compounds of this invention have the formula:

where R is hydrogen, methyl or ethyl; and X is

—$CH_2CH_2$— or —CH=CH—

Also included within the scope of this invention are salts of the compounds of Formula 1. The salts have the following formula:

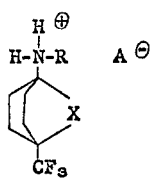

where R and X have the same meaning as above and where A is a non-toxic anion.

Representative of the salts of Formula 2 are the hydrochloride, sulfate, phosphate, acetate, maleate, succinate, adipate, propionate, tartrate, citrate and bicarbonate. Preferred anions are those derived from hydrochloric acid, acetic acid, phosphoric acid, maleic acid, carbonic acid and citric acid.

The free amines of this invention are generally soluble in organic solvents. They are moderately basic. The salts are usually colorless, high-melting, crystalline materials, soluble in water and insoluble in organic solvents.

The compounds of this invention can be prepared as follows:

Ethyl trifluoroacetate can be condensed with diethyl ethylidenemalonate using a base such as sodium ethoxide, to give an intermediate which can be cyclized in strong acid to yield 6-trifluoromethyl-3-carboethoxy-α-pyrone.

Reaction of the α-pyrone with ethylene produces ethyl 4-trifluoromethylbicyclo[2.2.2]oct - 2 - ene-1-carboxylate. The ethylene addition is usually carried out under pressures from 300 to 3000 atmospheres with temperatures between 150° and 300°.

Saponification of 4-trifluoromethylbicyclo[2.2.2]oct-2-ene-1-carboxylate yields the corresponding unsaturated acid.

A modified Curtius reaction using ethyl chloroformate and sodium azide is used to convert the unsaturated acid to 4-trifluoromethylbicyclo[2.2.2]oct - 2 - ene-1-amine hydrochloride.

Hydrogenation of ethyl 4-trifluorobicyclo[2.2.2]oct-2-ene-1-carboxylate using a catalyst such as platinum oxide produces ethyl 4 - trifluoromethylbicyclo[2.2.2]octane-1-carboxylate. Saponification with aqueous base gives the corresponding saturated acid.

4-trifluoromethylbicyclo[2.2.2]octane-1-carboxylic acid can be converted to 4-trifluoromethylbicyclo[2.2.2]octane-1-amine by the use of hydrazoic acid in a Schmidt reaction.

The amines may be reacted with formic acid in the presence of acetic anhydride to give the formyl derivatives, which may be reduced to the monomethylamines by the use of lithium aluminum hydride.

N-ethyl derivatives may be prepared by acetylation of the amino groups with acetyl chloride or acetic anhydride, followed by lithium aluminum hydride reduction.

The products of Formula 1 are basic in character and may be converted to their acid salts. For example, the hydrochloride is prepared by dissolving the base in an appropriate solvent such as ether and adding dry hydrogen chloride.

Illustrative of the compounds of this invention are the following: Non-toxic salts of these compounds are of course included as mentioned above.

4-trifluoromethylbicyclo[2.2.2]octane-1-amine
4-trifluoromethylbicyclo[2.2.2]oct-2-ene-1-amine
N-methyl-4-trifluoromethylbicyclo[2.2.2]octane-1-amine
N-ethyl-4-trifluoromethylbicyclo[2.2.2]oct-2-ene-1-amine This invention will be better understood by reference to the following illustrative examples.

EXAMPLE 1

4-trifluoromethylbicyclo[2.2.2]octane-1-amine
hydrochloride

To a stirred mixture of 0.646 mole of sodium ethoxide and 92 g. (0.646 mole) of ethyl trifluoroacetate was added 100 g. (0.538 mole) of diethyl ethylidenemalonate dropwise at 55°. After stirring overnight at room temperature the reaction mixture was poured onto 500 ml. (1.0 mole) of 2 N aqueous hydrochloric acid with stirring and cooling. The product was extracted into benzene, the combined benzene extracts were washed with a saturated aqueous sodium chloride solution and the organic layer was concentrated under reduced pressure to give 108 g. of a reddish oil.

The oil was divided into two portions, which were transformed to the α-pyrone in two different ways.

To a stirred ice-cold solution of 50 g. of concentrated sulfuric acid was added 15 g. of the oil dropwise. After stirring the mixture for 3 hours at room temperature, 150 ml. of ethanol was added dropwise with cooling. Then the reaction mixture was poured onto ice-water and the α-pyrone was extracted into methylene chloride. The combined methylene-chloride extracts were dried over anhydrous magnesium sulfate and the solvent was evaporated in vacuum to give a brown oil. The oil was crystallized with ethanol at −78° to afford 1.75 g. (10%) of 6-trifluoromethyl-3-carboethoxy-α-pyrone as light yellow crystals.

The above reaction sequence was repeated using 93 g. of oil, 187 g. (1.95 moles) of methanesulfonic acid in place of the sulfuric acid and 650 ml. of ethanol to give 11.65 g. (10.5%) of 6-trifluoromethyl-3-carboethoxy-α-pyrone, M.P. 111–3°.

The two identical products above were combined and a sample was recrystallized from ethanol for analysis, M.P. 114–5°.

Analysis.—Calc'd for $C_9H_7O_4F_3$: C, 45.7; H, 2.97. Found: C, 45.98; H, 3.22.

6 - trifluoromethyl - 3 - carboethoxy-α-pyrone (13.0 g., 0.0576 mole) was reacted with ethylene at 1000 atmospheres and 200° C. overnight. After venting the volatile materials, the residue was partially dissolved in ethanol, and some polyethylene was removed by filtration through Celite. The ethanol was removed by vacuum evaporation to yield 11.4 g. (83%) of ethyl 4-trifluoromethylbicyclo [2.2.2]oct-2-ene-1-carboxylate as a light yellow oil.

The unsaturated ester was hydrogenated in ethanol at 3 atmospheres pressure using 0.5 g. of platinum oxide. The catalyst was removed by filtration through Celite and the filtrate concentrated in vacuum to yield ethyl 4-trifluoromethylbicyclo[2.2.2]octane - 1-carboxylate as a colorless oil.

A suspension of the saturated ester in 250 ml. (0.5 mole) of 2 N aqueous sodium hydroxide was heated at reflux with stirring overnight, during which time all the oil dissolved. The reaction mixture was cooled and washed twice with ether. The aqueous solution was acidified with hydrochloric acid, the precipitate was collected by filtration and was washed free of chloride ion with water. After drying under high vacuum, there was obtained 8.0 g. (74%) of 4 - trifluoromethylbicyclo[2.2.2]octane-1-carboxylic acid as a colorless solid, M.P. 219–220°.

The saturated acid was also prepared by an alternative route.

A stainless-steel tube was charged with 12.0 g. (0.0606 mole) of 1,4 - dicarboxybicyclo[2.2.2]octane [J. Org. Chem., 30, 1431 (1965)] and 21.0 g. (0.1945 mole) of sulfur tetrafluoride and heated at 120° for 6 hours. All volatiles were then vented from the tube and the residue was digested with 125 ml. (0.25 mole) of 2 N aqueous sodium hydroxide. The aqueous solution was washed twice with ether, and some insoluble material was removed by filtration through Celite. The basic aqueous solution was acidified with concentrated hydrochloric acid and the precipitate was collected by filtration. It was washed free of chloride ion with water. The precipitate was heated in chloroform, the solvent was cooled and some insoluble starting material was removed by filtration. The filtrate was vacuum-evaporated to give 4.23 g. (42% based on recovered starting material) of 4-trifluoromethylbicyclo[2.2.2]octane-1-carboxylic acid as crystals, M.P. 220–2°. One recrystallization from heptane produced an analytical sample, M.P. 222–3°.

Analysis.—Calc'd for $C_{10}H_{13}F_3O_2$: C, 54.05; H, 5.86; F, 25.7. Found: C, 54.43; H, 6.12; F, 25.67.

A flask was charged with 6.0 g. (0.027 mole) of 4-trifluoromethylbicyclo[2.2.2]octane - 1-carboxylic acid, 27 ml. of sulfuric acid and 27 ml. of methylene chloride. With stirring and heating at reflux, 7.0 g. (0.108 mole) of sodium azide was added portionwise through the top of an ice-cooled wide-bore condenser. The reaction mixture was heated at reflux for 2 hours and after cooling, was poured onto 100 g. of ice. With cooling, ammonia was bubbled into the aqeuous mixture until it was basic. The product was extracted with methylene chloride, which after drying over potassium carbonate, was vacuum-evaporated to give 4 - trifluoromethylbicyclo[2.2.2]octane-1-amine as a colorless oil.

The amine was dissolved in ether and the amine hydrochloride was precipitated with dry hydrogen chloride. The precipitate was collected, washed well with ether and dried to afford 5.0 g. (81%) of 4-trifluoromethylbicyclo [2.2.2]octane-1-amine hydrochloride, as a colorless solid, M.P. >300°.

Analysis.—Calc'd for $CH_{14}NF_3 \cdot HCl \cdot H_2O$: C, 43.6; H, 6.86; N, 5.65; Cl, 14.35. Found: C, 43.13; H, 6.93; N, 5.73; Cl, 14.33. N.M.R., t., 8.1 (singlet)(12H): 5.3 (singlet)(3H). F–N.M.R. —$CF_3$ (singlet).

EXAMPLE 2

4-trifluoromethylbicylco[2.2.2]oct-2-ene-1-amine hydrochloride

A suspension of 1.0 mole of ethyl 4-trifluoromethylbicyclo[2.2.2]oct - 2-ene-1-carboxylate (Example 1) in 1700 ml. (5.1 moles) of 3 N aqueous sodium hydroxide is refluxed with stirring overnight. The reaction mixture is cooled and is washed two times with ether. The aqueous layer is acidified with concentrated hydrochloric acid, the precipitate is collected by filtration and washed with water. The precipitate is dried under high vacuum to yield 4 - trifluoromethylbicyclo[2.2.2]oct - 2 - ene-1-carboxylic acid as a colorless solid.

At —5° to 0°, with stirring, 1.1 mole of triethylamine is added dropwise to a solution of 1.0 mole of 4-trifluoromethylbicyclo[2.2.2]oct - 2 - ene - 1 - carboxylic acid dissolved in 750 ml. of acetone. A solution of 1.1 mole of ethyl chlorocarbonate in 250 ml. of acetone is then added dropwise and with stirring, at such a rate that the temperature of the reaction mixture remains between —5° to 0°. After the addition is complete, the mixture is stirred at —5° to 0° for 30 minutes and then a solution of 2 moles of sodium azide in 225 ml. of water is added dropwise at —5° to 0°. The mixture is stirred at this temperature for 30 minutes and then is poured onto 2250 ml. of ice-water. The mixture is extracted with four 1250-ml. portions of toluene. The combined toluene extracts are washed with 1 liter of water, dried thoroughly over anhydrous magnesium sulfate, and then heated cautiously on a steam bath. The toluene is then removed by vacuum-evaporation and the residual isocyanate is dissolved in 1 liter of benzyl alcohol. The alcohol solution is refluxed overnight and the alcohol is then removed under reduced pressure to yield the benzyl carbamate. Hydrogen chloride is bubbled through a hot solution (75°) of the carbamate in 1 liter of acetic acid for 4 hours. The acetic acid is removed by vacuum evaporation to give a residue of 4-trifluoromethylbicyclo[2.2.2]oct-2-ene-1-amine hydrochloride.

EXAMPLE 3

N-methyl-4-trifluoromethylbicyclo[2.2.2]octane-1-amine hydrochloride

A solution of 4-trifluoromethylbicyclo[2.2.2]octane-1-amine (Example 1) in 10 moles of 98–100% formic acid is stirred as 2 moles of acetic anhydride is added, keeping the temperature between 0 and 10° C. The mixture is allowed to stand 18 hours at room temperature, and is poured onto 5 kg. of ice. After the ice melts, the solution is adjusted to pH 8–9 with 50% sodium hydroxide, and the precipitate of N-formyl-4-trifluoromethylbicyclo[2.2.2]octane-1-amine is collected by filtration and dried.

A flask is charged with 1 mole of N-formyl-4-trifluoromethylbicyclo[2.2.2]octane-1-amine, 1 liter of diethylene glycol dimethyl ether and 1.5 moles of lithium aluminum hydride. The mixture is heated and stirred for 8 hours at 60° C. and for 2 hours at 120° C. After cooling, it is treated with the calculated quantities of water and 2 N aqueous sodium hydroxide to decompose the excess lithium aluminum hydride. The insoluble aluminum salts are removed by filtration and the filtrate is dried over anhydrous potassium carbonate. The dried filtrate is saturated with hydrogen chloride gas and concentrated by vacuum evaporation to give a residue of N - methyl - 4 - trifluoromethylbicyclo[2.2.2]octane - 1-amine hydrochloride.

EXAMPLE 4

N-ethyl-4-trifluoromethylbicyclo[2.2.2]oct-2-ene-1-amine hydrochloride

A mixture of 1 mole of 4-trifluoromethylbicyclo[2.2.2]oct-2-ene-1-amine hydrochloride with 500 ml. (1.5 moles) of 3 N aqueous sodium hydroxide is extracted with ether. The combined ether extracts are dried over anhydrous magnesium sulfate and the ether is vacuum-evaporated to give the free amine. A solution of the amine in 750 ml. of pyridine is stirred while 1.0 mole of acetyl chloride is added dropwise at such a rate that the temperature does not exceed 60° C. The mixture is refluxed for ½ hour, cooled and poured onto 5 liters of cold water. The resulting precipitate is filtered, washed well with water and dried to yield N-acetyl-4-trifluoromethylbicyclo[2.2.2]oct-2-ene-1-amine.

By using 1 mole of N-acetyl-4-trifluoromethylbicyclo[2.2.2]oct-2-ene-1-amine for the N-formyl-4-trifluoromethylbicyclo[2.2.2]octane-1-amine of Example 3, there is obtained N-ethyl-4-trifluoromethylbicyclo[2.2.2]oct-2-ene-1-amine hydrochloride.

EXAMPLE 5

4-trifluoromethylbicyclo[2.2.2]octane-1-amine acetate

An ethanol solution of 1.0 mole of 4-trifluoromethylbicyclo[2.2.2]octane-1-amine (Example 1) is stirred and 1.0 mole of acetic acid is added. The solution is concentrated by vacuum evaporation and diluted with ethyl ether. The product crystallizes and is filtered, washed with ethyl ether and dried. It is 4-trifluoromethylbicyclo[2.2.2]octane-1-amine acetate.

EXAMPLE 6

4-trifluoromethylbicyclo[2.2.2]oct-2-ene-1-amine succinate

A solution of 1.0 mole of 4-trifluoromethylbicyclo[2.2.2]oct-2-ene-1-amine (Example 4) in absolute ethanol is stirred as 1.0 mole of succinic acid is added. The solution is evaporated in a vacuum to yield crystalline 4 - trifluoromethylbicyclo[2.2.2]oct - 2 - ene - 1 - amine succinate.

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

The dosage administered will be dependent upon age, health and weight of the recipient, the kind of concurrent treatment if any, frequency of treatment, and the nature of the effect desired. Generally, a daily dosage of active ingredient compound will be from about 0.1 to 20 mg. per kg. of body weight, although lower, such as 0.02 mg./kg., or higher amounts can be used. Ordinarily, from 0.1 to 8 and preferably 0.2 to 4 mg./kg. per day, in one or more applications per day, is effective to obtain the desired result.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.02% by weight based on the total weight of the composition and not more than 99% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 or 2 and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight. These dosage forms preferably contain from about 1 to about 500 mg. of active ingredient, with from about 1 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 2.5% by weight of the active ingredient.

As mentioned above, oral administration can be in a suitable suspension or syrup, in which the active ingredient ordinarily will constitute from about 0.02 to 10%, and preferably about 0.1 to 2.5% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain one aspect of the present invention:

EXAMPLE 7

A large number of unit capsules are prepared for oral administration by filling standard two-piece hard gelatin capsules weighing about 30 mg. each with 5 mg. of powdered 4-trifluoromethylbicyclo[2.2.2]octane-1-amine hydrochloride, 100 mg. of lactose and 0.2 mg. of "Cab-O-Sil" finely divided silica.

EXAMPLE 8

A large number of unit capsules are prepared for oral administration by filling soft gelatin capsules with a solution of 4-trifluoromethylbicyclo[2.2.2]oct-2-ene-1-amine in vegetable oil.

EXAMPLE 9

Example 7 is repeated except that the dosage unit is 5 mg. of active ingredient, 5 mg. of gelatin, 3 mg. of magnesium stearate and 100 mg. of mannitol, mixed and formed into a tablet by a conventional tableting machine. Slow release pills or tablets can also be used by applying appropriate coatings.

EXAMPLE 10

A parenteral composition suitable for administration by injection is prepared by stirring 0.5% by weight of the active ingredient of Example 7 in sterile aqueous 0.9% saline.

Since obviously many variations of the invention can be made without departing from the spirit and scope thereof, it is to be understood that the foregoing detailed description has been given for clearness of understanding only, and no unnecessary limitations are to be interpreted therefrom.

The disclosure herein should not be considered a recommendation to utilize the disclosed invention in any way without full compliance with U.S. Food and Drug Laws.

The invention claimed is:

1. A compound selected from the group consisting of (a) compounds of the formula:

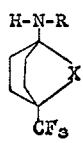

where
R is selected from the group consisting of hydrogen, methyl and ethyl, and
X is selected from the group consisting of —CH₂CH₂— and —CH=CH—; and (b) salts of the compounds of Formula (a) formed with a non-toxic anion.

2. 4-trifluoromethylbicyclo[2.2.2]octane-1-amine.
3. 4-trifluoromethylbicyclo[2.2.2]oct-2-ene-1-amine.
4. The hydrochloride of the compound set forth in claim 1.
5. The hydrochloride of the compound set forth in claim 2.

References Cited
UNITED STATES PATENTS
3,256,329  6/1966  Kauer _____ 260—563

CHARLES B. PARKER, *Primary Examiner.*
P. C. IVES, *Assistant Examiner.*